United States Patent [19]

Timmons et al.

[11] 4,276,599
[45] Jun. 30, 1981

[54] METHOD OF PROCESSING WELL LOGGING DATA

[75] Inventor: John P. Timmons, White Plains N.Y.; James J. Maricelli, Houston, Tex.

[73] Assignee: Schlumberger Technology Corporation, New York, N.Y.

[21] Appl. No.: 51,018

[22] Filed: Jun. 22, 1979

Related U.S. Application Data

[63] Continuation of Ser. No. 276,348, Jul. 31, 1972, abandoned.

[51] Int. Cl.³ .......................... G01V 3/32; G01V 3/38
[52] U.S. Cl. .................................. 364/422; 324/323; 324/339; 340/860
[58] Field of Search ............... 364/300, 421, 422, 728; 340/860; 324/323, 339; 33/133, 142

[56] References Cited

U.S. PATENT DOCUMENTS 3,396,787  8/1968  Vann ................................... 340/860
3,497,958  3/1970  Gollwitzer .......................... 340/860
3,552,025  1/1971  Whitfill ............................... 340/860
3,566,478  3/1971  Hurlston ............................... 33/142
3,568,143  3/1971  Naquin, Jr. ....................... 364/421 X Primary Examiner—Jerry Smith
Attorney, Agent, or Firm—Cooper, Dunham, Clark, Griffin & Moran

[57] ABSTRACT

In accordance with an illustrative embodiment of the invention a technique is set forth for processing well logging data derived from two or more well logs derived from separate passes through a borehole. More particularly, normalized correlation functions are determined at a particular depth level for different depth displacements between the well logs. This is repeated for different depth levels and a single display of the correlation functions as a function of depth displacement is produced to enable more accurate determination of the depth match between the well logs.

17 Claims, 8 Drawing Figures

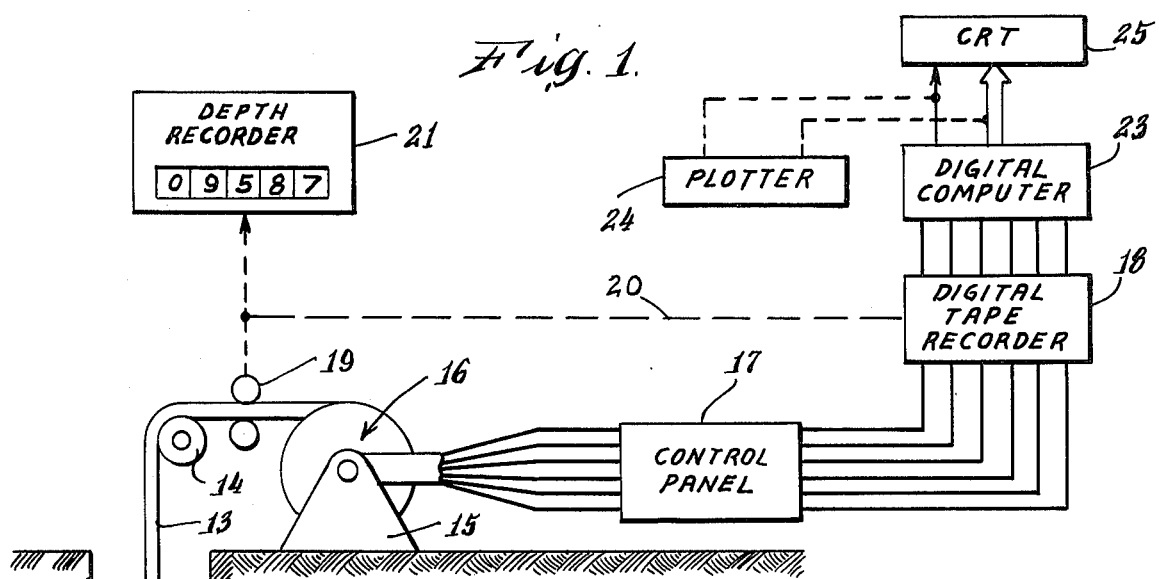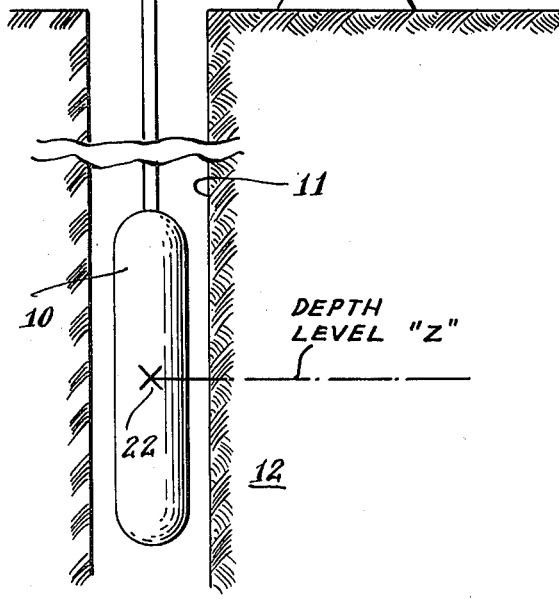

METHOD OF PROCESSING WELL LOGGING DATA

This is a continuation of application Ser. No. 276,348, filed July 31, 1972, now abandoned.

This invention relates to methods for correlating the relative depth levels of well logging data derived from separate passes through a borehole. In particular, the invention relates to data processing techniques for accomplishing such depth correlation.

In the logging of an earth borehole, measurements of various formation characteristics are taken at different depth levels throughout the borehole by means of a measuring device which is lowered into the borehole on the end of a supporting cable extending from the surface of the earth. Typically, the measurements taken along the length of the borehole are intended to provide indications of oil or gas bearing strata. It is more and more the practice to combine measurements taken during different runs through a borehole with different investigating devices to produce computed measurements of various characteristics or parameters of the earth formations. When combining measurements made during two separate runs through the borehole, it is important that the separately derived measurements be accurately correlated in depth with one another.

In the past, sheave-wheel devices located at the surface of the earth have provided measurements of the length of cable which passes over the sheave wheel. Unfortunately, such a cable length measuring device does not accurately take cable stretch into account. One cable length measuring system which accounts for cable stretch is shown in U.S. Pat. No. 3,497,958 granted to L. H. Gollwitzer on Mar. 3, 1970. This Gollwitzer system measures the tension in the cable at the surface of the earth and at the tool and corrects the cable length measurements derived from the sheave wheel device for changes in stretch of the cable as reflected by the tension measurements. The Gollwitzer system also corrects for sheave wheel calibration errors and temperature effects on cable stretch.

While the Gollwitzer system has been found to provide extremely accurate depth measurements, there are factors which can cause even the elaborate Gollwitzer system to produce slight errors. For the usual situation, these errors are insignificant and can be ignored. However, when considering the more recent sophisticated and high-powered computational techniques, it becomes desirable to obtain highly accurate depth alignment between data derived from separate runs or passes through the borehole before combining such data for computational purposes.

One method of determining depth alignment between data is shown in U.S. Patent Application Ser. No 70,709 filed Sept. 9, 1970 by D. H. Tinch et al and now abandoned. This Tinch method uses standard correlation equations to determine depth displacements at various depth levels for application in obtaining depth alignment at these depth levels.

To determine depth alignment, the Tinch et al application employs known equations for computing correlation factors to determine the similarity between two samples of data. Initially the value of the correlation factor is determined for one depth displacement between the two samples. Then, other values of the correlation factor are determined for other depth displacements. The correlation factors thus determined are then combined to produce a correlation function for the depth level under consideration. The resulting values of the correlation factors are compared and a depth displacement corresponding to the maximum value of the correlation factor is selected as the correct depth displacement for the depth level being investigated.

It has been observed that incorrect depth displacements sometimes result when a correlation factor value is affected by large differences between the values of the two samples of the data used in the correlation. One way to reduce the number of incorrectly selected depth displacements is to use equations for correlation factors employing value normalization wherein a mean value of each sample used in the evaluation of the correlation function is subtracted from each sample. However, values for the correlation function similar to the values corresponding to a possibly correct depth displacement are sometimes present. In such cases, it is difficult to determine the correct depth displacement. If one of these similar values is used to select the depth displacement, an incorrect depth displacement will result.

Various other methods have been proposed to improve the determination of the correct depth displacement. For example, the computed values of the correlation function have been listed as a table of values. By careful examination of this table characteristics of each correlation function which might affect the determination of the depth displacement could be ascertained. Similarly, the values of the correlation factor for each depth level of interest have been separately displayed. Investigation of the entire correlation function for a specific depth level in this manner did not substantially increase the reliability of the determination of the correct depth displacement and the recognition of undesired results. In addition investigation of a number of correlation functions over the depth interval under consideration has not heretofore proved too helpful in evaluation of the correct depth displacements.

However, we have unexpectedly found that when a number of normalized correlation functions determined from closely spaced depth intervals are displayed together, analysis of the changes in the correlation function at different depth levels is an aid in eliminating undesirable effects from the correlation function and substantially improves the determination of the correct depth displacement at each depth level.

In accordance with the present invention, a method of machine processing well logging data separately derived from investigating devices passed through a borehole comprises producing first and second separately derived well logging data and determining for a selected depth level values of a normalized correlation function corresponding to a number of displacements for samples of said first and second data over a selected well logging data interval. A second depth level proximate to the first depth level is selected and values for the normalized correlation function are again determined. Finally, the values of the correlation functions are displayed as a function of the depth displacements.

For a better understanding of the present invention, together with other and further objects thereof, reference is had to the following description taken in connection with the accompanying drawings, the scope of the invention being pointed out in the appended claims.

Referring to the drawings:

FIG. 1 shows an investigating device in a borehole along with apparatus at the surface of the earth for controlling the investigating apparatus and recording the measurements derived therefrom;

FIG. 2 is an example of logs produced from separate passes through a borehole;

FIG. 3 represents the relationship between several parameters used in accordance with the present invention;

Figure 4A:
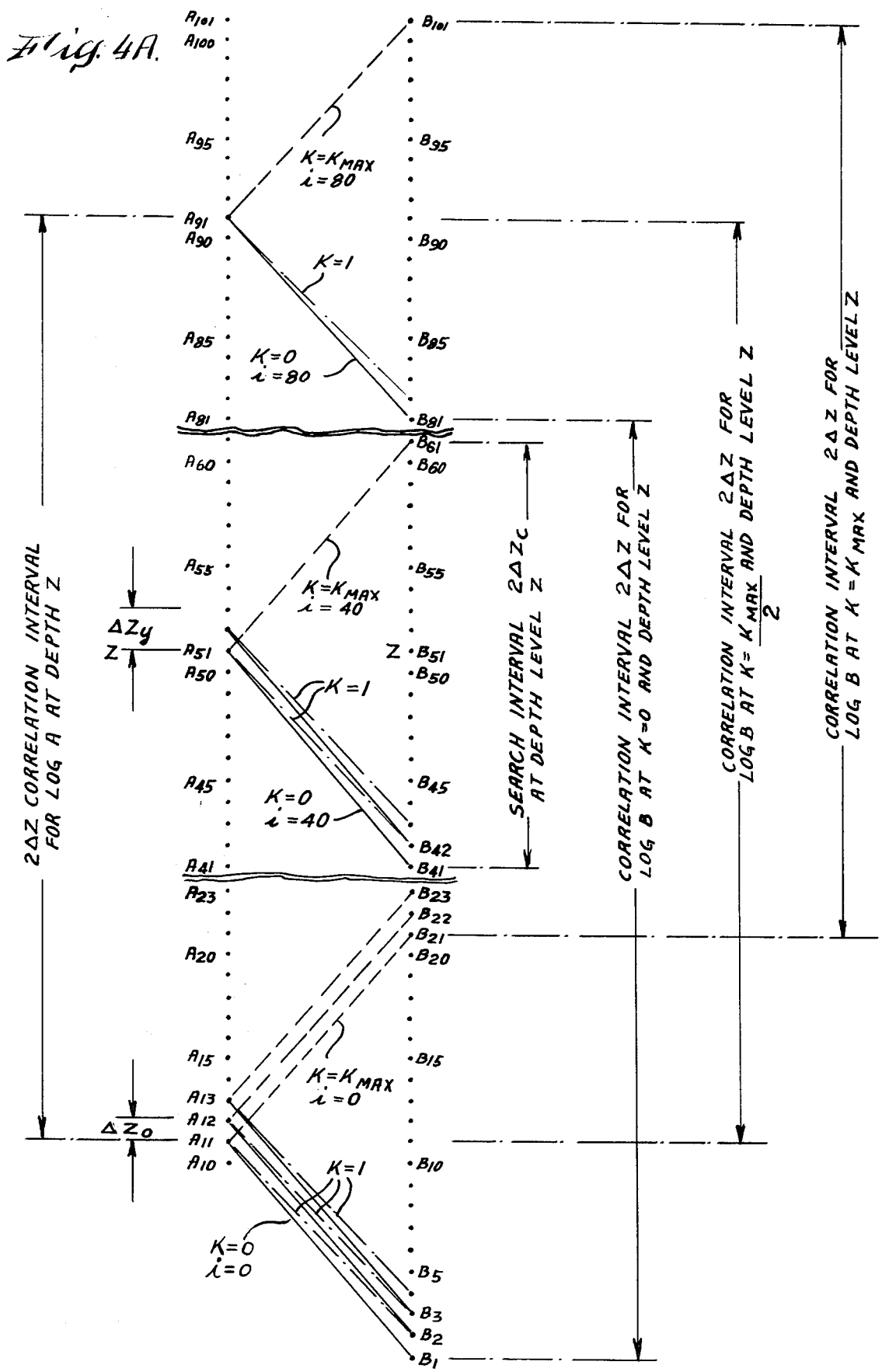
FIG. 4A shows two logs obtained from separate passes through a borehole for purposes of defining certain parameters used throughout this specification.

Now, referring to FIG. 1, there is shown an investigating device 10 in a borehole 11 for investigating subsurface earth formations 12. The investigating apparatus 10 is supported in a borehole 11 on an end of a cable 13. The cable 13 passes over a sheave wheel 14 and is secured to a drum and winch mechanism 15. The drum and winch mechanism 15 includes a suitable brush and slip ring arrangement 16 for providing electrical connections between the cable conductors and a control panel 17. The control panel 17 operates to supply power and control signals to the downhole investigating apparatus and includes suitable electronic circuitry for receiving well logging measurements from the investigating apparatus and readying such measurements for application to a digital tape recorder 18.

The tape recorder 18 converts the analog signals received from the control panel 17 into digital signals and is stepped as a function of depth by a driving wheel 19 which engages the cable 13 and mechanical linkage 20. The digital signals are then either transmitted or carried to digital computer 23 for processing. The output of the digital computer is then used to drive a standard plotter 24, or provide real time processing by driving a cathode ray display system, 25. One such display system, shown in U.S. Pat. No. 3,648,250 issued on Mar. 7, 1972 provides intensity modulation of the Z-axis. Other standard CRT's can be used to provide the usual X-Y displays. In either case the CRT is modified to provide a permanent film display as taught in U.S. Pat. No. 3,475,761 granted to Samodai et al on Oct. 28, 1969. As shown the output of the computer includes a stepping command to control the movement of the film and start of the CRT scan. This command also controls the plotter.

The investigating apparatus 10 has a reference point 22 which constitutes the center or recording point of the investigating apparatus 10. Because of the long elastic cable 13, the investigating apparatus 10 is subject to displacement arising from cable stretch thus causing the true depth level to be different from the depth level registered by a depth recorder 21 derived from the driving wheel 19. The depth level registered by the depth recorder 21, which is identical with that registered by the tape recorder 18, is designated "Z". When attempting to depth-match a log produced by the investigating apparatus 10 with the log produced from another investigating apparatus passed through the borehole 11 at a different time, there is a distinct possibility that the logs recorded by the two investigating apparatus at the same depth level will not be referenced to the same depth level.

Referring to FIG. 2, there are seen two logs, A and B, of the same or similar measurements made during different passes through a borehole. By observation it can be seen that the two logs have similar, though depth shifted, details. Considering the log A as the base log, it can be seen that at the depth level $Z_1$, log B is depth shifted an amount X from log A. The same holds true at depth level $Z_2$. Then at depth level $Z_3$, the two logs suddenly are depth matched, i.e., the depth shift is equal to 0. Then at depth level $Z_4$, the depth shift becomes 3X. When attempting to combine the associated elements of logs produced and recorded on the separate borehole passes A and B of FIG. 2, the results may well be in error because of the lack of depth matching.

It is the purpose of the present invention to utilize two similar logs made from separate passes through the borehole to correlate the depth levels of all logs produced during one pass with all logs produced during the second pass. Such similar logs are considered to be the same log, such a gamma ray log made on two separate passes, similar logs having similar characteristics such as two porosity logs made with different types of investigating devices, or logs which may be initially dissimilar but which can be made to appear similar as by combining two logs made during one pass to produce a third log for correlation with a log derived from a second pass through a borehole. In any event, this correlation is accomplished by utilizing the log fluctuations of logs A and B to indicate the amount of depth shift of one log relative to the other log.

Turning now to FIG. 3 to define certain terms used herein, there are shown the two logs A and B to be correlated. The presently considered depth level, shown on log A in FIG. 3, is designated Z. This depth level Z for both logs A and B is initially the depth level given by the surface depth registering apparatus. Thus, for data recorded on magnetic tape, it is the depth indicia on the magnetic tape. The depth interval over which data is used to produce the correlation function $C_K$ (to be defined below) is designated the correlation interval, $2\Delta Z$. The depth interval which curves A and B are sampled in the correlation process is designated the sample interval $\Delta Z_o$, as shown in FIG. 3. Thus $2\Delta Z/\Delta Z_o$ is the number of samples in the correlation interval and is designated m. In practice, samples at each end of the correlation interval are included making the number of samples considered in the correlation process, n, equal to $2\Delta Z/\Delta Z_o + 1$. The maximum amount by which curve B is displaced relative to curve A for any given depth level Z is, as shown in FIG. 3, designated $2\Delta Z_C$. This interval called the search interval is divided uniformly into smaller intervals called search steps. After the logs A and B have been depth correlated at the depth level Z, the same process is repeated at a new depth level which is an interval $\Delta Z_y$, called the correlation step from the presently considered level Z.

As a first step in the depth correlation process, one curve (in this case curve B) is effectively depth shifted one search step at a time relative to the other curve (curve A) and a correlation factor $C_K(Z)$ is computed for each search step to produce a correlation function, $C(Z)$ for depth level Z. The search step is for simplicity herein considered to be $\Delta Z_o$, the same as the sample interval, but in practice could assume any value. The correlation factor $C_K(Z)$ is computed using a normalized root mean square equation. An equation of this type is discussed in detail in section 12.4, page 169 of the book "Introduction to Probability in Statistics", by Henry L. Alder and Edward B. Roessler, published in 1964 by W. H. Freeman and Co., of San Fransisco, Calif. One form of the equation to compute elements of the correlation function is:

$$C_K(Z) = \frac{n \sum_{i=0}^{m} A_{z-l+i} B_{z-h+i+K} - \sum_{i=0}^{m} A_{z-l+i} \sum_{i=0}^{m} B_{z-h+i+K}}{\sqrt{\left(n \sum_{i=0}^{m} A_{z-l+1}^2 - \left(\sum_{i=0}^{m} A_{z-l+i}\right)^2\right)\left(n \sum_{i=0}^{m} B_{z-h+i+K}^2 - \left(\sum_{i=0}^{m} B_{z-h+i+K}\right)^2\right)}}$$

where A and B are the values of the two logs:

i is the sample interval number and increases between 0 and m where m is equal to $2\Delta Z/\Delta Z_o$;

K is the displacement number of log B relative to log A in samples and increases between 0 and $K_{max}$ such that $K_{Max} \Delta Z_o$ is the search interval $2\Delta Z_c$;

z is the correlation step number in samples and corresponds to the depth level Z;

h is a depth offset for log B in samples and is equal to $(\Delta Z + \Delta Z_c)/\Delta Z_o$;

l is a depth offset for log A and is equal to $\Delta Z/\Delta Z_o$;

$C_K(Z)$ is the correlation factor for the displacement value of K at a depth level Z; and n is the number of samples used in computing the correlation factor and is equal to m+1.

These parameters will be described in detail later.

Turning now to FIG. 4A, it will be described how the computation of the correlation function $C_K$ takes place. In FIG. 4A, there are shown the sample points versus depth for two logs A and B. The log values for the successive sample points for the two logs A and B are designated $A_1$, $A_2$, $A_3$, etc., and $B_1$, $B_2$, $B_3$, etc. Common subscripts for the logs A and B indicate common initial depth levels as they would be recorded as derived from the exploring devices run through the borehole. For example, the log value $A_1$ is initially assumed to be on depth with the log value $B_1$. Now, assume in FIG. 4A that logs A and B at depth level Z are to be correlated. In this case, assuming log A to be the base log, that point on log B which corresponds in true depth with the same point on log A at depth level Z is to be found and shifted, if necessary, to the depth level Z. Desirably, after such shifting, the data sample of log B which was derived from the same true depth as the sample of log A at depth Z is now referenced to the depth level Z.

To accomplish this, a plurality of correlation factors $C_K(Z)$ are computed for given values of K between 0 and $K_{Max}$ for the depth level Z under consideration to produce a correlation function C(Z) where, as discussed earlier, K is the displacement number in samples. Since the search step is equal to $\Delta Z_o$, each increase of K by 1 will correspond to $\Delta Z_o$ depth shift on the log. For each value of K, $C_K(Z)$ is computed over the correlation interval $2\Delta Z$ from i=0 to i=m. The correlation interval $2\Delta Z$ is substantially greater than the search interval $2\Delta Z_c$. Although it is not necessary that the depth interval between each sample used in producing the correlation factors $C_K(Z)$ be the same as the search step (i.e., that $\Delta Z_o$ be the interval for both i and K), such has been done for this example to simplify the illustration.

To explain how the correlation operation takes place, an example of such an operation will be described using FIG. 4A. Assume that $\Delta Z_o$ is 6 inches, $\Delta Z_y$ is 12 inches, $\Delta Z$ is 20 feet, $\Delta Z_c$ is 5 feet and the first depth level to be correlated is that given by sample $A_{51}$. Furthermore, assume that the interval between successive data samples in FIG. 4A is 6 inches, e.g., $A_1$ to $A_2$ and $B_1$ to $B_2$ is 6 inches. In this situation, both Z and z will be initially set to 51 and l will be 40 (i.e., $\Delta Z/\Delta Z_o=40$), h will be 50 (i.e., $(\Delta Z + \Delta Z_c)/\Delta Z_o=50$), m will be 80 (i.e., $2\Delta Z/\Delta Z_o=80$).

The first step is to compute $C_K(Z)$ for K=0 and Z=51. To accomplish this, in accordance with equation (1), $C_K(Z)$ for K=0 is computed taking into account all i's from i=0 to i=m. Thus, for each term, initially, i is set equal to 0 and the A and B values combined in accordance with equation (1); then i is set equal 1, 2 ... m in turn whereupon the condition i=m, the value of each term is complete. The values of the terms, are then combined per equation (1) to produce $C_K(Z)$ for K=0. Taking the values given above for this example, for K=0 and i=0, $A_{z-l+i}=A_{51-40+0}=A_{11}$ will be combined with $B_{z-h+i+K}=B_{51-50+0+0}=B_1$; for i=1, $A_{12}$ and $B_2$..., and so on until i=m which is equal to 80, $A_{51-40+80}=A_{91}$ with $B_{51-50+80+0}=B_{81}$. The solid lines running between the A and B log values in FIG. 4A represent, for a few exemplary cases, how the log A and log B values are combined for the condition K=0 to produce the A·B product terms of equation (1) for summation. For the individual A and B summation terms $$\text{(e.g., } \sum_{i=0}^{m} A_{z-l+i}\text{),}$$

the A and B log values for n values of i between 0 and m are accumulated. Thus, for K=0, $A_{11}$ to $A_{91}$ are summed and $B_1$ to $B_{81}$ are summed. Similarly the individual A·A, B·B and A·B product terms are evaluated. Then, all of the product summation and individual A and B summation terms are combined in accordance with equation (1) to produce $C_K(Z)$ for K=0. In FIG. 4A, the log B correlation interval $2\Delta Z$ for K=0 at depth level Z is shown. Log B over this depth interval is combined with log A over its correlation interval $A_{11}$ to $A_{91}$. This log A correlation interval is the same for all values of K for K=0 through K=$K_{MAX}$ at depth level Z.

Next, K is incremented by 1 and $C_K(Z)$ for K=1 computed in the same manner. Thus, considering the A·B term of equation (1), for K=1, at i=0, $A_{z-l+i}=A_{51-40+0}=A_{11}$ is combined with $B_{z-h+i+K}=B_{51-50+0+1}=B_2$; for i=1, $A_{51-40+1}=A_{12}$ with $B_{51-50+1+1}=B_3$; and so on until at i=m, $A_{51-40+80}=A_{91}$ with $B_{51-50+80+1}=B_{82}$. The dash-dot lines running between the A and B logs shows, for a few illustrative log samples, how log A and log B values are combined for the condition K=1. The individual A summation terms will be the same for all K's at any given Z since the A terms are not depth dependent on K. However, for the B terms which are depth dependent on K, $B_2$ to $B_{82}$ will be summed for K=2.

This same process is repeated for all K values K=0 to K=$K_{Max}$ which, in this example, is 20. Considering the A·B term for $K_{Max}$(K=20) at i=0, $A_{z-l+i}$=$A_{51-4-0+o}$=$A_{11}$ will be combined with $B_{z-h+i+K}$=$B_{51-50+0+20}$=$B_{21}$; at i=1, $A_{51-40+-1}$=$A_{12}$ with $B_{51-50+1+20}$=$B_{22}$; and so on until at i=m=80, $A_{51-40+80}$=$A_{91}$ will be combined with $B_{51-50+80+20}$=$B_{101}$. The combination of log A and log B values for the condition K=$K_{Max}$ is represented in FIG. 4A by the dashed lines. For the B summation terms of equation (1), $B_{21}$ to $B_{101}$ will be used. The log B correlation interval for K=$K_{Max}$ is shown in FIG. 4A as extending between $B_{21}$ and $B_{101}$ and is combined with log A over its correlation interval $A_{11}$ to $A_{91}$. Also shown in FIG. 4A is the log B correlation interval for K=$K_{Max}$/2. As seen in FIG. 4A, the depth intervals for logs A and B exactly coincide for K=$K_{Max}$/2. In other words, the subscripts for A·B terms used in equation (1) are identical when K=$K_{Max}$/2 for all i's between 0 and m.

To determine the depth displacement at the next depth level which is an interval $\Delta Z_y$=12 inches away (for the present example), z is incremented by 2 and the same operation repeated, i.e., $C_K(Z)$ for all K's between 0 and $K_{Max}$ are computed, etc., to evaluate C(Z) at Z=Zl.

Figure 4B:
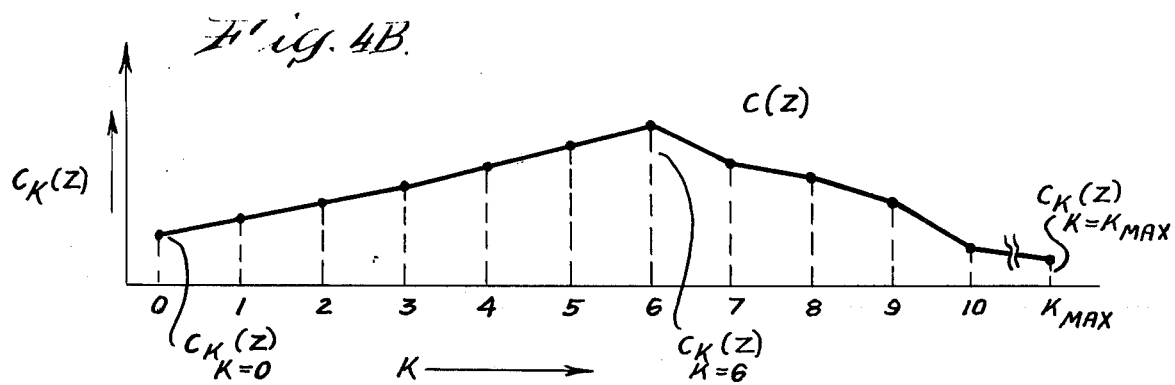
FIG. 4B is a graphical representation of a correlation function, or correlogram, for one depth level.

Now referring to FIG. 4B, there is shown a graphical representation of correlation function, C(Z), herein also referred to as the correlogram. Values of K from K=0 to K=$K_{Max}$ are plotted along the abscissa and the value of $C_K(Z)$ computed from equation (1) for each value of K is plotted along the ordinate. Each $C_K(Z)$ value is represented as a point on the correlogram curve corresponding to a particular value of K. For example, the value $C_K(Z)$ for K=0 is represented by the first element of the correlogram. Similarly the value $C_K(Z)$ for K=6 is represented by the seventh element and $C_K(Z)$ for K=$K_{Max}$ is represented by the final ement of the correlation function.

In accordance with the invention, it has been found that graphic representations of normalized correlation functions determined for substantially overlapping correlation intervals are useful in the determination of the correct depth displacements for well logs. In addition the analysis of changes in depth displacements at various depth intervals and the evaluation of undesirable effects are facilitated. Overlapping correlation intervals occur when the correlation step, $\Delta Z_y$, is less than the correlation interval. For substantial overlapping $\Delta Z_y$ should not exceed about 20% of the correlation interval and is preferably no more than 5% of the correlation interval.

Figure 5:
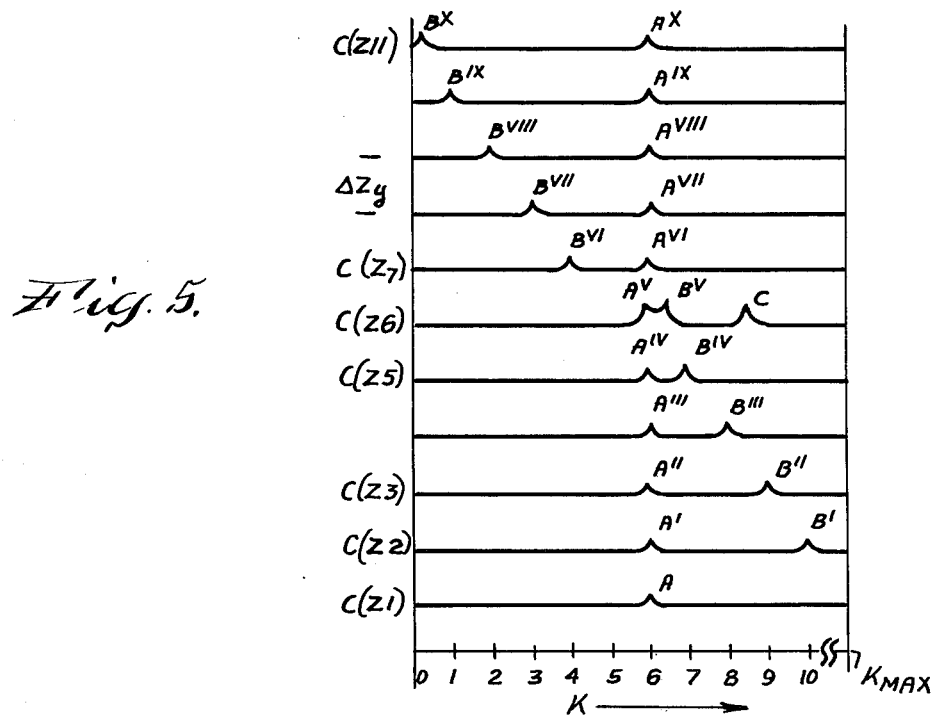
FIG. 5 is a display of a number of correlation functions for a depth interval of investigation.

FIG. 5 shows a plurality of normalized correlation functions taken at substantially overlapping correlation intervals. As shown therein, each curve, C(Z1) through C(Z11) is a correlogram computed at adjacent, relatively closely spaced depth intervals. To produce the display, a correlogram of a particular depth level is computed after which the depth is incremented by $\Delta Z_y$ and the correlogram computed for the adjacent depth level. This process continues until a correlogram for all depth levels of interest is computed. Then the correlograms for successive depth levels are outputted on a standard plotter or CRT display as shown when correlation intervals for each successive correlation function substantially overlap and the sense of continuity necessary to follow a given feature in the correlogram becomes apparent. In this way the correlograms can be more accurately analyzed and the undesirable features taken into account.

To illustrate this, refer to the correlogram displayed for depth level Z1 and labeled C(Z1). In FIG. 5, there is shown a single peak denoted as A corresponding to displacement number of K=6. This is the usually expected correlogram and presents no problem in determining the corresponding depth displacement. However, the correlation function sometimes contains two peaks of nearly equal value, such as is represented by A' and B' corresponding to K=6 and K=10, respectively for the correlogram C(Z2).

It has been observed that the presence of two or more peaks in normalized correlation functions is associated with some features of logs which do not have exact similarity, particularly when the features result in a change in the mean value of the log under correlation with the base log (i.e., log B uniquely changes its average amplitude). The values for elements of the correlation function corresponding to depth displacements where the log feature is included in the ends of the correlation interval for log B but is not included in the correlation interval for log A are adversely affected and sometimes create additional indications of similarity between the two logs. These additional indications or peaks persist despite the use of normalized equations for correlation factors as discussed earlier.

When two peaks having approximately equal magnitude are present in a correlation function, it is obvious that there may arise some difficulty in determining the correct displacement for such a correlation function. For example, at depth level Z=Z2, the depth displacement may be determined as corresponding to either K=6 or K=10. Similarly, the depth displacement may be determined as corresponding to either K=6 or K=9 for peaks A" and B" for depth level Z=Z3. If the depth displacement corresponding to either K=9 or K=10 was used an incorrect depth displacement would result.

By using substantially overlapping correlation functions such as shown in FIG. 5, it has been found that such additional indications of similarity usually appear at displacements corresponding to slightly different depth displacements for each overlapping correlation function while the correct indication of depth displacement appears at about the same displacement in each correlation function. Thus as shown in FIG. 5, the displacement of peak B shifts systematically as the depth level of investigation changes while the displacement of peak A remains nearly constant with each successive correlogram. Thus, from this display it is clear that the correct depth displacement is indicated by peak A and the depth displacement indicated by peak B can be safely disregarded. Large isolated peaks, in the correlogram, caused for example by noise, are easily seen on the correlogram display and disregarded. Thus, the peak C occurring at level Z6, can be disregarded since it does not reappear in the correlograms of levels Z5 or Z7.

Figure 7:
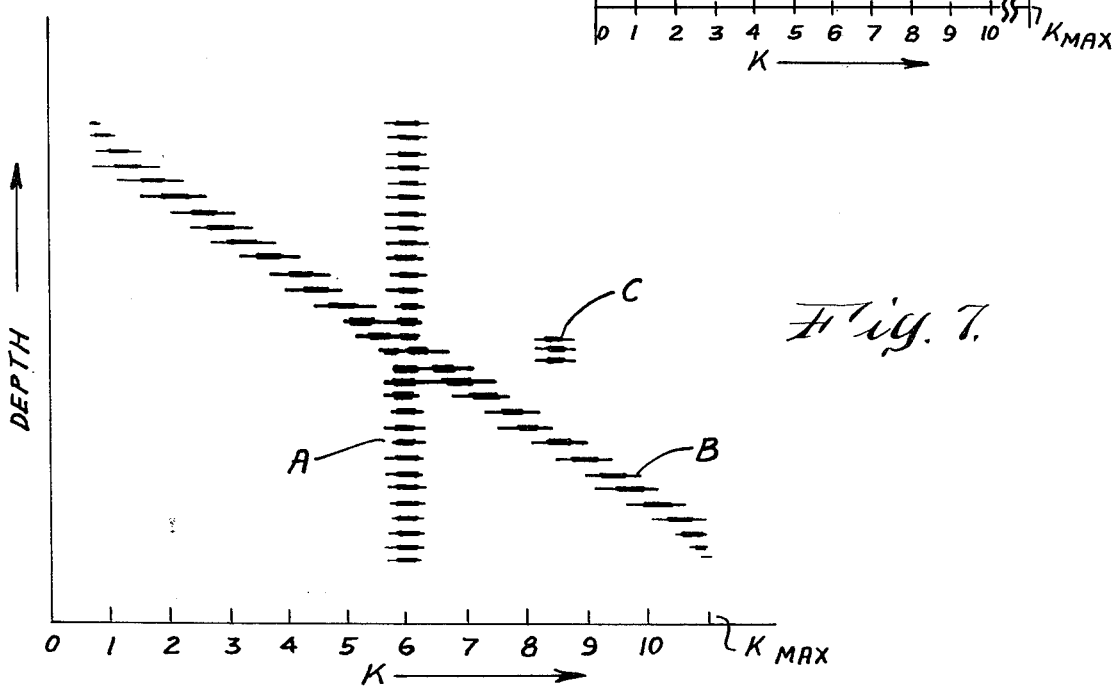
FIG. 7 is another display of the correlation functions for a depth interval.

Referring now to FIG. 7 there is shown a variable density display of the correlograms corresponding to the same depth interval as shown in FIG. 5. The variable density display causes a dark area to appear at the K value where the peaks are seen in FIG. 5. Thus a display such as FIG. 7 shows the maximum appearing at about K=6 along the depth interval and the peak which migrates across the display. Also the isolated peak is readily seen.

Figure 6:
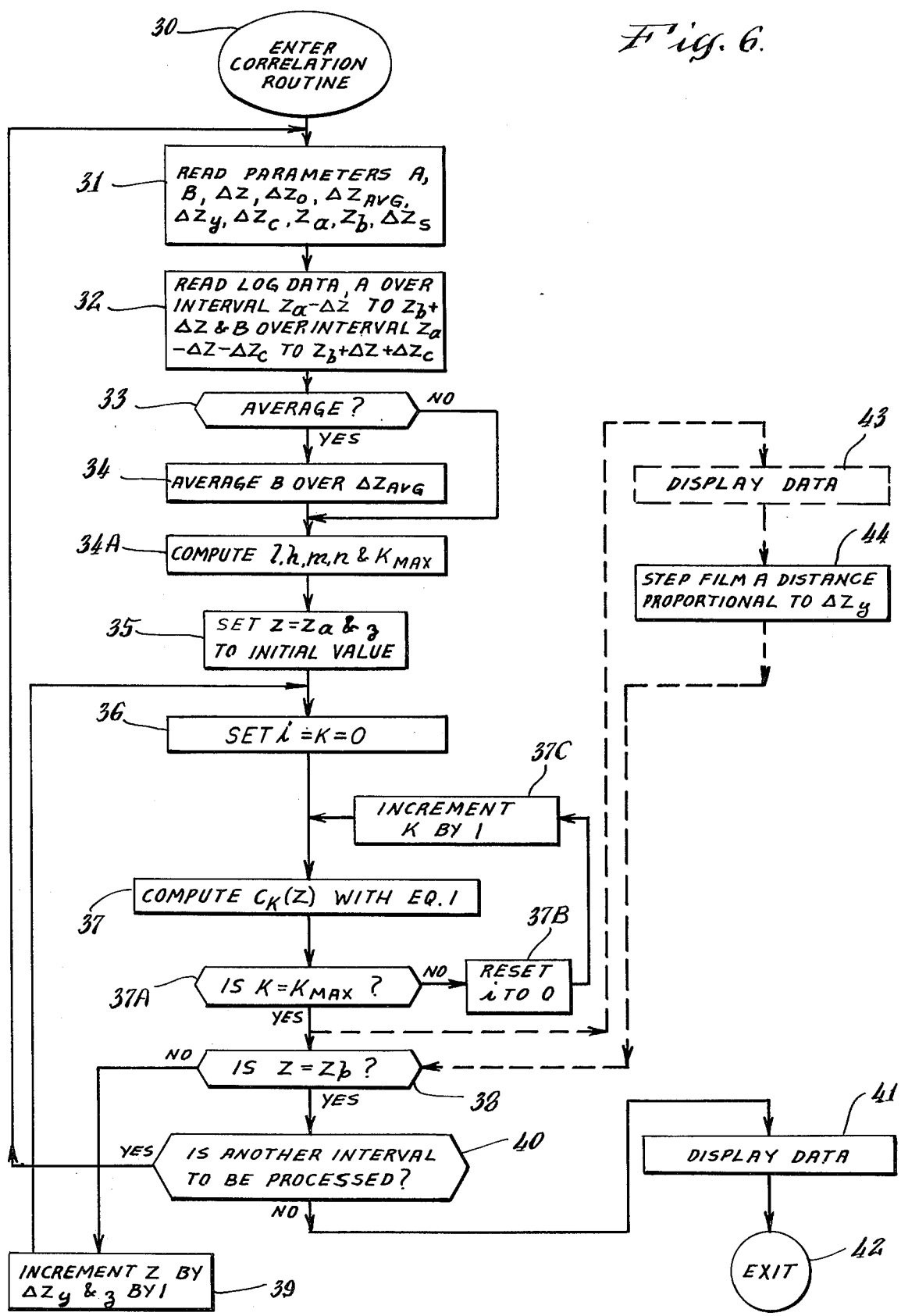
FIG. 6 is computer flow diagram representation of how the techniques of the present invention might be implemented.

FIG. 6 represents the invention as it can be performed on a general purpose digital computer of a suitable size and configuration such as an IBM 360/65 of conventional configuration. The log data input may be via digital tapes recorded on digital tape recorder 18, as shown in FIG. 1 and previously discussed, or through alternate input, as disclosed in the previously referenced Tinch et al application. Each of the steps of the detailed flow diagrams depicted in FIG. 6 may be directly translatable into any of a number of standard computer programming languages such as Fortran or P1/1 and used to program a digital computer to perform the data processing steps shown in the figures.

Now turning to FIG. 6, there is shown a flow diagram depicting a representative implementation of the techniques of the present invention. After the depth correlation routine is entered (element 30), the various parameters used by the program are read as represented by element 31. This includes the designation of the logs A and B which are to be used in the correlation process, as well as the above discussed constants, $\Delta Z$, $\Delta Z_o$, $\Delta Z_C$, $\Delta Z_S$, $\Delta Z_y$, as well as a depth interval $\Delta Z_{Avg}$ representing a depth interval over which the B log, can if desired, be averaged. Additionally, the lowest and highest depth levels to be correlated, designated $Z_a$ and $Z_b$ respectively, are read, i.e., the depth interval over which the depth correlation is to be performed.

Next, as represented by a block 32, the log data A over the depth inverval $Z_a - \Delta Z$ to $Z_b + \Delta Z$ is read and the log data B over the interval $Z_a - (\Delta Z + \Delta Z_C)$ to $Z_b + (\Delta Z + \Delta Z_C)$ is read. Next, as represented by the decision element 33, a decision is made as to whether the B log is to be averaged and if so, as represented by block 34, it is averaged using the averaging interval $\Delta Z_{Avg}$. If the B log is not to be averaged, block 34 is by-passed. Since the FIG. 6 flow diagram has previsions for averaging only the B log, that log which is not to be averaged will always be considered as the A log in block 31. If desired, both the A and B logs could be averaged.

Now with the values of the logs A and B over the necessary depth intervals stored in memory, the correlation process is ready to begin. As a first step, Z is set equal to $Z_a$ and z is set equal to its initial value, as represented by block 35. As discussed earlier, z is the depth sample number and represents a given sample of data in memory. Initially, z will be equal to $(\Delta Z + \Delta Z_C)/\Delta Z_C + 1$ if the data samples for the first depth level considered are at z=1, i.e., $A_1$ and $B_1$. Then as represented by block 36, i and K are set equal to 0.

Now, $C_K(Z)$ for all values of K can be computed using equation (1) over the depth interval $Z - \Delta Z$ to $Z + \Delta Z$ where initially Z is equal to $Z_a$. To accomplish this operation is the function of elements 37, 37A, 37B and 37C in FIG. 6. As represented by element 37, $C_K(Z)$ is computed using equation (1) where initially K=0. The operation depicted by block 37, of course, includes a number of individual steps which are not shown in FIG. 6 since it is well known how to perform such an operation. Briefly, such an operation could be implemented essentially as was described in connection with FIG. 4. Namely, i could be incremented one unit at a time to accumulate the appropriate $A_{z-l+i}$ and $B_{z-h+i+K}$ values to produce the $$\sum_{i=0}^{m} A_{z-l+i}$$

and $$\sum_{i=0}^{m} B_{z-l+i+k}$$

terms of equation (1) and the appropriate $A_{z-l+i}$ and $B_{z-h+i+K}$ terms multiplied together and accumulated to produce the $$\sum_{i=0}^{m} A_{z-l+i} \cdot B_{z-h+i+k}$$

term of equation (1). These accumulated terms can then be combined in accordance with equation (1) to produce $C_K(Z)$.

Once $C_K(Z)$ is computed, it is determined if $K=K_{Max}$ as represented by decision element 37A. If not, i is reset to 0 and K is incremented by 1, as represented by blocks 37B and 37C. The program then returns to block 37 to compute a new $C_K(Z)$. The program continues around this loop until $C_K(Z)$ is computed for all K's from K=0 to $K_{Max}$. Once $C_K(Z)$ for $K=K_{Max}$ has been computed, the answer to the question asked by decision element 37A is YES and the program proceeds to decision element 38 where it is determined is Z is equal to $Z_b$. If $Z<Z_b$, the program increments Z by $\Delta Z_y$ and by 1 as depicted in block 39 and the next depth level in the interval is correlated. If Z is equal to $Z_b$, it is determined if another interval is to be processed as represented by decision element 40, and if so, the program returns to the elements 31 and 32 to read a new set of data to correlate another interval of log data. Once all the depth intervals have been processed the information is ready for display, as represented by block 41. Any standard plotter or CRT display can be used as is known in the art. For example, if a drum plotter is used, the depth displacement values, K, are plotted along the axis perpendicular to the direction of travel of the graph paper and the values of the correlation function, $C_K(Z)$, for each value of K are plotted with their values represented along the axis parallel to the direction of travel of the graph paper. A complete correlogram for a selected depth level or Z value is displayed. Then the paper is shifted by an amount proportional to the correlation step, $\Delta Z_y$, and the next correlogram displayed. This continues until a correlogram for all depth levels of interest has been displayed such as shown in FIG. 5 after which the program exits, block 42.

Alternatively, after the correlation factor for each depth level has been computed, the correlation function can be immediately displayed. Thus, after a YES answer from decision element 37A, the dotted lines indicate that the data for one correlogram for one depth level is inputed to a display device block 43 such as a cathode ray tube which provides a variable density display such as disclosed in the above referenced U.S. Pat. No. 3,648,250 or standard CRT either of which is equipped with a film display. After the correlogram has been displayed the film is stepped a distance proportional to the depth level increment, as shown in block 44 and the program returns to decision element 38 where the processing continues as described above. As described two displays are provided. Of course, there can be provided appropriate provisions for eliminating one of the displays.

While only a particular mode of practicing the invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A well logging method of producing a single record containing two or more adjacent and mutually registered traces showing the respective degrees of mutual fit, at two or more respective adjacent depth levels in an earth formation, of a plurality of well logs separately taken in one or more boreholes in the formation, each respective trace showing the degree of mutual fit of the logs at the respective depth level when respective portions of the logs are depth displaced relative to each other over a respective depth interval at selected displacement steps, comprising the following machine implemented steps:
    deriving a first and a second well log separately taken in one or more boreholes in the earth formation;
    finding the degree of mutual fit between the first and the second well log at a first selected depth level in the formation when respective portions of the logs are depth displaced relative to each other over a respective first depth interval at selected displacement steps;
    finding the degree of mutual fit between the first and the second log at a second selected depth level, adjacent to the first selected depth level, when respective portions of the logs are depth displaced relative to each other over a respective second depth interval at selected displacement steps;
    producing a first trace showing the degree of fit found at the first depth level and a second trace showing the degree of fit found at the second depth level, and forming the first and the second trace on a single record adjacent to each other and in mutual registration with each other, said single record of the first and the second trace indicating and emphasizing the correct relative depth displacement between the first and the second log for best mutual fit between the logs and de-emphasizing any spurious indications of best fit at other relative depth displacements between the logs.

2. The well logging method of claim 1 in which the first depth interval and the second depth interval substantially overlap.

3. The well logging method of claim 1 including selecting further successively adjacent depth levels, finding the respective degree of mutual fit between the first and the second log at each respective one of said successive depth levels when respective portions of the logs are depth displaced relative to each other over respective depth intervals at selected displacement steps, and producing a respective trace showing the respective degree of fit at each respective one of said further depth levels and forming the last recited traces on a single record, successively adjacent to each other and in mutual registration with each other.

4. The well logging method of claim 3 in which the respective depth intervals for the respective adjacent depth levels substantially overlap.

5. The well logging method of claim 4 including normalizing the amplitude of each of said traces prior to forming the trace on the record.

6. The well logging method as in claim 5 in which the step of forming the traces on the single record includes forming the traces in a two-dimensional coordinate system in which one axis is relative depth displacements between the logs and the other axis is depth level, wherein the trace for a given depth level extends along the depth displacement axis and the traces for different depth levels are spaced from each other along the depth level axis.

7. The well logging method of claim 6 in which each step of finding the degree of mutual fit between the first and the second well log at a given depth level includes combining the respective portions of the logs in accordance with a normalized correlation function to find a normalized correlogram indicative of the respective degree of fit between the logs at the given depth level.

8. The well logging method of calim 7 in which the step of combining log portions to find a normalized correlogram for a given depth level in the formulation includes combining log portions which extend a given distance up and down in depth level from said given depth level.

9. The well logging method of claim 8 in which each step of forming a trace on the single record comprises forming a trace in which amplitude changes are represented by intensity or density modulation of an otherwise straight trace.

10. The well logging method of claim 8 in which each step of forming a trace on the single record comprises forming a trace in which amplitude changes are indicated by excursions of the trace along the depth level axis direction.

11. A well logging method of producing a single record containing a multiplicity of successively adjacent and mutually registered traces showing the respective degrees of mutual fit at respective successively adjacent depth levels in an earth formation of a plurality of well logs separately taken in one or more boreholes in the formation, each given trace showing the degree of mutual fit at a given depth level of portions of the logs which are within a selected depth interval above and below the given depth level, comprising the following machine implemented steps:
    deriving a plurality of logs separately taken in one or more boreholes in the earth formation;
    at each given one of a succession of depth levels, finding the degree of mutual fit between respective portions of the logs, which are over a respective depth interval above and below the given depth level, when the log portions are depth displaced relative to each other at selected displacement steps;
    for each given one of said successive depth levels, producing a trace showing the degree of fit found at the given depth level, and forming the traces on a single record, sucessively adjacent to each other and in mutual registration with each other, said single record indicating the relative shift between the log portions at each depth level for best fit at that level and emphasizing trends in correct shift while de-emphasizing spurious indications of best fit.

12. The well logging method of claim 11 in which the finding step includes finding the mutual degrees of fit at successive depth levels for respective successive depth intervals which overlap with each other.

13. The well logging method of claim 12 in which the step of forming the traces on a single record comprises forming the traces in an orthogonal coordinate system in which one axis is relative depth displacement between logs and the other is depth level in the earth formation, each trace extending generally along the depth displacement axis and the traces for adjacent depth levels being adjacent to but spaced from each other along the depth level axis.

14. The well logging method of claim 11 in which the step of deriving comprises deriving each log in the form of a succession of samples, there being a respective sample for each respective one of said depth levels, and in which for each given depth level the depth interval comprises a selected number of samples preceding and succeeding in depth level the given depth level and each selected displacement step corresponds to the depth level difference between two successive samples.

15. The well logging method of claim 11 in which each finding step comprises combining the respective portions of the logs in accordance with a normalized correlation function in order to produce a correlogram for the respective depth level based on the respective depth interval and the selected displacement steps.

16. The well logging method of claim 11 in which the step of forming the traces on a single record comprises representing amplitude changes in the trace by density modulation or intensity modulation of a trace which generally extends along a straight line.

17. The well logging method of claim 11 in which the step of forming the traces on a single record comprises forming each trace as a line which extends generally in one direction but is amplitude modulated to make excursions in an orthogonal direction.

* * * * *